United States Patent

[15] 3,688,263

Balogh, Jr. et al.

[45] Aug. 29, 1972

[54] METHOD AND APPARATUS FOR DIAGNOSING OPERATION OF A DIGITAL PROCESSOR

[72] Inventors: Edward Balogh, Jr., Diamond Bar; Daewen J. Cook, Monrovia; Carl E. Bube, Los Angeles; Robert V. Airhart, Glendora, all of Calif.

[73] Assignee: Burroughs Corporation, Detroit, Mich.

[22] Filed: April 19, 1971

[21] Appl. No.: 135,333

[52] U.S. Cl. ................................340/172.5, 235/153

[51] Int. Cl. ..........................G06f 11/04, G05b 23/02

[58] Field of Search ....................340/172.5; 235/153

[56] References Cited

UNITED STATES PATENTS

| | | | |
|---|---|---|---|
| 3,536,902 | 10/1970 | Cochran et al. | 235/153 |
| 3,518,413 | 6/1970 | Holtey | 235/153 |
| 3,548,177 | 12/1970 | Hartlipp et al. | 235/153 |
| 3,585,608 | 6/1971 | Osborne | 340/173 |
| 3,405,258 | 10/1968 | Godoy et al. | 235/153 |
| 3,363,236 | 1/1968 | Robertson | 340/172.5 |
| 3,343,141 | 9/1967 | Hackl | 340/172.5 |
| 3,576,541 | 4/1971 | Kwan et al. | 340/172.5 |

*Primary Examiner*—Gareth D. Shaw
*Assistant Examiner*—Jan E. Rhoads
*Attorney*—Christie, Parker & Hale

[57] ABSTRACT

There is described a digital processor which, in response to a unique instruction, may be interrupted at any point in the fetch or execution of the next instruction and the contents of all the control flip-flops and registers can then be stored in a predetermined location in memory, following which the processor branches to a diagnostic routine.

5 Claims, 1 Drawing Figure

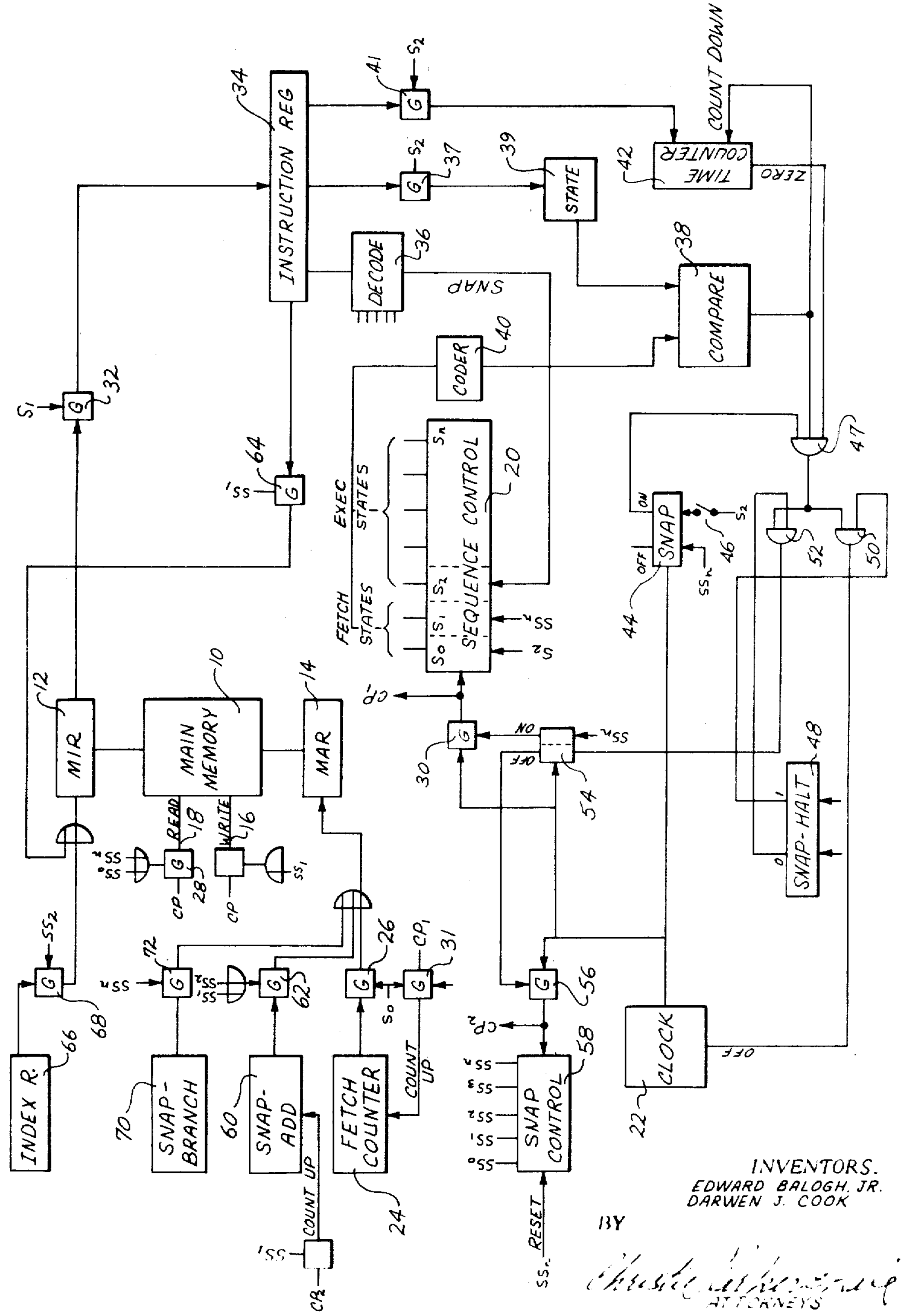
INVENTORS.
EDWARD BALOGH, JR.
DARWEN J. COOK
BY
ATTORNEYS

METHOD AND APPARATUS FOR DIAGNOSING OPERATION OF A DIGITAL PROCESSOR

FIELD OF THE INVENTION

This invention relates to electronic digital processors, and more particularly, is concerned with an arrangement for interrupting the operation of the computer at any preselected clock time in the execution of any selected instruction.

BACKGROUND OF THE INVENTION

In the maintenance of complex digital processing equipment, special diagnostic test routines have been developed to generate test data capable of isolating faults or malfunctions of the circuitry to specific circuit components or at least to definable subsystems within the equipment being tested. To develop test data it is necessary to be able to establish certain known input conditions to an isolated portion of the circuit and to be able to observe the resulting output conditions. Achieving fault isolation has generally required setting up predetermined states in the machine by a series of scan-in operations. A series of such operations are designed to utilize all the logic and to set the various registers and flip-flops within the computer. Each scan-in operation is followed by a scan-out operation to determine the resulting status of all the registers and flip-flops. By comparing the scan-out operations with predetermined correct results, it is possible to analyze what portion of the logic circuitry is malfunctioning. However, to force the registers and flip-flops into such predetermined states by the scan-in operation requires extensive additional hardware in the computer to implement the test conditions during the scan-in operation.

SUMMARY OF THE INVENTION

The present invention is directed to an arrangement for testing the computer to analyze fault conditions by means of a special instruction which can be inserted at any point in a diagnostic program to establish a test condition. The invention takes advantage of the fact that in the execution of the standard instructions of the computer, the processor eventually goes through all the control states necessary to isolate a fault condition. During the fetch and execution of each instruction, the processor is designed to go through a sequence of states or machine cycles which are synchronized with successive clock pulses. A fault at any point in the circuitry of the processor will cause an error during one or more states of the computer encountered in fetching or executing one or more of the machine instructions.

The present invention provides an arrangement for interrupting the processor at any state during the fetch or execution of any machine instruction and further, where that state is repeated a number of times during the execution of one machine instruction, interrupting the processor following any one of the times that state is encountered during the execution of that instruction.

This is accomplished in brief, by providing a special instruction referred to as a SNAP instruction which can be inserted at any point in the diagnostic program. The instruction specifies the machine state which is to be examined and the number of times that state is to be repeated during the execution of an instruction before it is examined. The SNAP instruction is inserted in the program just ahead of the instruction during which the fault analysis is to take place. Means is provided for recognizing when the processor reaches the desired state during the fetching or execution of the selected machine instruction. When the desired state is reached, the operation of the computer may be halted by turning off the clock, or the machine cycle may be completed and the resulting settings of all the registers and flip-flops be transferred into assigned memory locations. The processor can then branch to a diagnostic routine for analyzing the fault condition.

DESCRIPTION OF THE DRAWINGS

For a more complete understanding of the invention, reference should be made to the accompanying drawing wherein the single FIGURE is a block schematic diagram of the preferred embodiment of the invention.

DETAILED DESCRIPTION OF THE INVENTION

Referring to the drawing in detail, there is shown in simplified form a processor incorporating the features of the present invention. The numeral 10 indicates generally an addressable memory having a memory information register (MIR) 12 and a memory address register (MAR) 14. A signal applied to the Write input line 16 causes the contents of the MIR to be written into the memory location specified by the contents of MAR register 14. Similarly, a signal on the Read line 18 causes the contents of the memory location specified by the MAR register 14 to be placed in MIR register 12.

When programmed, the main memory 10 contains a group of instructions which are normally read out in sequence, each instruction being executed by the processor using data stored in the main memory 10. This is accomplished under the control of a sequence counter 20, for example, which is advanced through a series of states in synchronism with clock pulses CP derived from a clock source 22. At the various states of the sequence counter output are designated $S_0$ through $S_n$.

When the sequence counter is in the $S_0$ state, operation is initiated by transferring an address from a Fetch counter 24 through a gate 26 to the MAR register 14. The Fetch counter points to the location in memory of the next instruction in the stored program. The next clock pulse is applied to the Read input of main memory through a gate 28, causing the first instruction to be transferred to the MIR register 12. The same clock pulse, applied through a gate 30 to the sequence counter 20, advances the sequence counter 20 to the next state $S_1$. At the same time, the same clock pulse advances the Fetch counter by one through a gate 31.

During the $S_1$ state, the contents of MIR 12 are transferred by a gate 32 to an Instruction register 34. In normal operation, the instruction would include a section which is binary coded to specify a particular operation, referred to as the OP code. The OP code section in the Instruction register 34 is applied to a decoding circuit 36 which provides an output signal on a particular one of a number of output lines depending upon which OP code is present.

Assuming that the instruction is a SNAP instruction, according to the present invention, the output line labeled "SNAP" from the decoding circuit 36 provides an output to the sequence control counter 20 which, in response to the next clock pulse and the presence of the "SNAP" instruction, advances the sequence control to the $S_2$ state, which is the initial state for executing the SNAP instruction. In addition to the OP code specifying a SNAP operation, the SNAP instruction includes a coded field designating the state of the sequence counter on which normal operation is to be interrupted and a coded field designating the number of times the processor is to enter the particular state before being interrupted.

During the $S_2$ state, the portion of the instruction specifying a particular state of the sequence counter is transferred by a gate 37 to a register 39 for storage. The section of the instruction in the Instruction register 34 specifying the number of times that the processor should enter the particular control state is transferred by a gate 41 to a counter 42. A SNAP control flip-flop, indicated at 44, is turned on by the next clock pulse. This completes the execution of the SNAP instruction. The sequence counter 20 is returned from the $S_2$ state to the $S_0$ state by the same clock pulse that turns on the control flip-flop 44. A SNAP Mode switch 46 may be provided which must be closed in order to have the control flip-flop 44 turned on. If the SNAP Mode switch 46 is open, the control flip-flop 44 remains off and the SNAP instruction will have no subsequent effect on the operation of the processor.

The Fetch operation is then repeated by transfer of the address of the next instruction from the counter 24 to the MAR register 14, doing a memory Read and transferring the instruction from the MIR register 12 to the Instruction register 34. The new instruction, whatever it might be, is decoded and the output of the decoder 36 sets the sequence control counter 20 to an initial state required for executing the particular instruction. As the sequence control 20 advances through the various control states incident to the execution of the particular instruction, a coder 40 senses the various control states and provides a binary coded output which is applied to one input of a Compare circuit 38. The other input of the Compare circuit 38 is derived from the register 39 which stores the control state specified previously by the SNAP instruction. Whenever the sequence control counter 20 enters the control state corresponding to that specified by the register 39, the output of the Compare circuit 38 goes true. This output is applied to the counter 42 causing the counter 42 to be counted down 1. Whenever the time counter 42 is counted down to zero, indicating that the sequence control has entered the specified state a number of times corresponding to the initial setting of the counter 42, the counter is counted down to zero, providing an output signal on the zero line. This line, together with the output of the Compare circuit 38 and the On state of the control flip-flop 44 are applied to an AND circuit 47, the output of which goes true when the processor has reached the condition originally specified by the SNAP instruction.

At this point, the processor may take either one of two possible actions depending upon the setting of a SNAP-Halt control flip-flop 48. This control flip-flop, which may be previously set in any number of ways which are not material to understanding the invention, if turned Off indicates a normal SNAP operation, but if turned On indicates a SNAP-Halt operation. Assuming the SNAP-Halt control flip-flop 48 is On, an AND circuit 50, in response to the output of the AND circuit 47, provides a signal to the clock source 22 which turns off the clock. Thus all further action of the processor is halted at the specified state of the sequence control 20. This mode of operation might be used, for example, where it is desired to go into the processor and manually measure or observe the static conditions of the processor at the time of entering the specific control state.

In the normal operation, however, the processor is allowed to complete the specified control state by the generation of the next clock pulse. This allows all the registers and control flip-flops to be set in their usual manner. The operation of the normal execution of the instruction is then halted. The contents of all of the control flip-flops and registers are now transferred to predetermined locations in main memory and the processor branches to a test routine for diagnosing the operation of the processor in executing the particular instruction which was interrupted.

To accomplish this, when the SNAP-Halt control flip-flop 48 is Off, an AND circuit 52, connected to the output of the AND circuit 47 and to the Off side of the control flip-flop 48, goes true. The output of the AND circuit 52 is applied to a control flip-flop 54 which is normally On. The control flip-flop 54 controls the gate 30, permitting clock pulses to be applied to the sequence control counter 20 when the control flip-flop 54 is On. After the output of the AND circuit 52 goes true, the next clock pulse turns the control flip-flop 54 off, preventing any further advancement of the sequence control 20 or change of any of the registers or control flip-flops within the processor normally connected to the clock pulse source 22 through the gate 30.

When the control flip-flop 54 is turned off, it opens a gate 56, gating clock pulses from the clock 22 to a SNAP Control counter 58. The SNAP Control counter 58 is advanced through a series of states designated $SS_0$ through $SS_n$ by successive clock pulses passed by the gate 56. With the SNAP Control counter advanced from $SS_0$ to $SS_1$ by the first clock pulse, a SNAP address is transferred from a SNAP-Add register 60 by a gate 62 to the MAR register 14, the address pointing to a base address of a location in memory for storing the contents of the various working registers and control flip-flops of the processor. For example, the contents of the Instruction register 34 may be stored in the initial address location. Thus a gate 64 in response to the $SS_1$ state, transfers the contents of the Instruction register 34 to the MIR register 12. The next clock pulse is then applied to the Write input 16 of the main memory causing the contents of the Instruction register to be stored in the specified address location in main memory. At the same time the address in the SNAP-Add register 60 is counted up one to the next address location and the SNAP Control counter 58 is advanced to the $SS_2$ state. The same operation is repeated with the contents of an Index register 66, for example, being transferred by a gate 68 to the Information register 12. The SNAP Control counter 58 advances through as many states as is required to store the contents of all the registers and control flip-flops in the main memory 10. When the SNAP Control counter 58 is advanced to the final state $SS_n$, the processor is caused to branch to a location where a diagnostic routine is stored in main memory. This address may be stored in a SNAP Branch register 70 and is transferred to the MAR register 14 through a gate 72, the next clock pulse causing the first instruction of the diagnostic routine to be transferred from main memory into the MIR register 12. At the same time, the control flip-flop 54 is turned on again and the sequence counter 20 is set to the $S_1$ state. Also the SNAP Control counter 58 is reset to $SS_0$ and the SNAP Control flip-flop 44 is turned off. Operation now continues in a normal manner, with the first instruction of the diagnostic routine being transferred to the Instruction register 34 by the gate 32 where it is decoded and executed in conventional fashion.

From the above description it will be seen that the SNAP instruction when executed sets the stage for interrupting the processor during the Fetch or execution phase of the next instruction. The SNAP instruction accomplishes this by setting a control flip-flop on and storing information specifying the logic state of the processor at which the operation of the processor is to be interrupted. Moreover, the interruption may take place only after the specified state of the processor is entered a predetermined number of times, which is particularly useful in diagnosing operations where an instruction calls for an iterative type of operation to take place, such as the over-and-over addition type of multiplication operation. By use of the SNAP instruction it is thereby possible to provide fault isolation programs which can isolate a fault to a particular failure state.

What is claimed is:

1. In a digital data processor in which machine stored instructions are fetched from a memory and executed, apparatus for testing the operation of the processor comprising a clock source, a memory, register means for storing an instruction, means for fetching an instruction from memory into said register means, means responsive to an instruction stored in said register for advancing the processor through a plurality of states in synchronism with said clock source to execute the instruction, means responsive to a predetermined instruction in the register means for storing information identifying a particular state of the processor, comparing means for comparing the plurality of states of the processor in fetching and executing a subsequent instruction with the state stored in said information storing means, and means responsive to the comparing means for interrupting the processor when it is in the particular state indicated by said information storing means.

2. Apparatus as defined in claim 1 further including means responsive to said predetermined instruction in said register for storing information identifying a count condition, counting means responsive to said comparing means for counting each time the processor is set to said particular state, said processor interrupting means including means for interrupting the processor only when the counting means is counted a number of times corresponding to said count condition.

3. Apparatus as defined in claim 1 further including means responsive to said interrupting means for storing the contents of selected registers in the processor in a predetermined location in memory.

4. Apparatus as defined in claim 2 further including means responsive to said interrupting means for storing the contents of selected registers in the processor in a predetermined location in memory.

5. In a data processor in which a sequence of coded instructions are executed one at a time by advancing the processor through a sequence of logical states determined by the particular instruction being executed, apparatus for interrupting the operation of the processor at any selected logical state comprising means storing coded information identifying a preselected state of the processor, means responsive to a particular instruction when executed for loading the storing means with coded information identified by the instruction, control means set by said particular instruction for initiating a comparison between the state identified by the coded information in said storing means and each subsequent logical state of the processor, and means responsive to the control means for interrupting the normal operation of the processor when the processor is in the state corresponding to the state identified by said coded information in the storing means.

* * * * *